(12) United States Patent
Pani

(10) Patent No.: US 9,667,431 B2
(45) Date of Patent: May 30, 2017

(54) METHOD AND SYSTEM FOR CONSTRUCTING A LOOP FREE MULTICAST TREE IN A DATA-CENTER FABRIC

(71) Applicant: Cisco Technology, Inc., San Jose, CA (US)

(72) Inventor: Ayaskant Pani, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 184 days.

(21) Appl. No.: 14/333,151

(22) Filed: Jul. 16, 2014

(65) Prior Publication Data

US 2015/0124654 A1 May 7, 2015

Related U.S. Application Data

(60) Provisional application No. 61/900,359, filed on Nov. 5, 2013.

(51) Int. Cl.
| | |
|---|---|
| *H04L 12/24* | (2006.01) |
| *H04L 12/18* | (2006.01) |
| *H04L 12/761* | (2013.01) |
| *H04L 12/753* | (2013.01) |
| *H04L 12/721* | (2013.01) |

(Continued)

(52) U.S. Cl.
CPC .......... *H04L 12/18* (2013.01); *H04L 12/4633* (2013.01); *H04L 41/082* (2013.01); *H04L 41/12* (2013.01); *H04L 41/22* (2013.01); *H04L 43/0811* (2013.01); *H04L 45/50* (2013.01); *H04L 45/02* (2013.01); *H04L 45/12* (2013.01); *H04L 45/16* (2013.01); *H04L 45/18* (2013.01); *H04L 45/20* (2013.01); *H04L 45/28* (2013.01); *H04L 45/48* (2013.01); *H04L 45/64* (2013.01); *H04L 49/201* (2013.01); *H04L 49/25* (2013.01); *H04L 61/2007* (2013.01);

(Continued)

(58) Field of Classification Search
None
See application file for complete search history.

(56) References Cited

U.S. PATENT DOCUMENTS

| | | |
|---|---|---|
| 6,456,624 B1 | 9/2002 | Eccles et al. |
| 7,152,117 B1 | 12/2006 | Stapp et al. |

(Continued)

FOREIGN PATENT DOCUMENTS

WO   WO 2014071996   5/2014

OTHER PUBLICATIONS

Whitaker, Andrew, et al., "Forwarding Without Loops in Icarus," IEEE Openarch 2002, pp. 63-75.

*Primary Examiner* — Vinncelas Louis
(74) *Attorney, Agent, or Firm* — Polsinelli LLP

(57) ABSTRACT

Systems, methods and transitory computer-readable storage media for constructing a loop free multicast tree. The methods include observing a network topology transition affecting a first path from the particular node to a root node, calculating a second path from the particular node to the root node and sending a message to an upstream node requesting that the upstream node be a root port in the calculated second path. If the upstream node agrees to be the root port in the calculated second path, the method further includes creating a new FTAG tree topology view that includes the upstream node as the root port in the second path.

17 Claims, 3 Drawing Sheets

(51) Int. Cl.
*H04L 12/703* (2013.01)
*H04L 12/705* (2013.01)
*H04L 12/26* (2006.01)
*H04L 12/733* (2013.01)
*H04L 12/751* (2013.01)
*H04L 12/947* (2013.01)
*H04L 12/931* (2013.01)
*H04L 12/715* (2013.01)
*H04L 29/12* (2006.01)
*H04L 29/06* (2006.01)
*H04L 12/46* (2006.01)

(52) U.S. Cl.
CPC ...... *H04L 61/2061* (2013.01); *H04L 61/6004* (2013.01); *H04L 69/22* (2013.01); *H04L 61/103* (2013.01)

(56) References Cited

U.S. PATENT DOCUMENTS

| | | | |
|---|---|---|---|
| 7,177,946 B1* | 2/2007 | Kaluve | H04L 45/48 370/256 |
| 7,826,400 B2 | 11/2010 | Sakauchi | |
| 7,848,340 B2 | 12/2010 | Sakauchi et al. | |
| 8,339,973 B1 | 12/2012 | Pichumani et al. | |
| 8,868,766 B1 | 10/2014 | Theimer et al. | |
| 9,258,195 B1 | 2/2016 | Pendleton et al. | |
| 9,374,294 B1 | 6/2016 | Pani | |
| 9,444,634 B2 | 9/2016 | Pani et al. | |
| 2003/0067912 A1 | 4/2003 | Mead et al. | |
| 2003/0115319 A1 | 6/2003 | Dawson et al. | |
| 2004/0103310 A1 | 5/2004 | Sobel et al. | |
| 2004/0160956 A1 | 8/2004 | Hardy et al. | |
| 2004/0249960 A1 | 12/2004 | Hardy et al. | |
| 2005/0010685 A1 | 1/2005 | Ramnath et al. | |
| 2005/0013280 A1 | 1/2005 | Buddhikot et al. | |
| 2005/0083835 A1 | 4/2005 | Prairie et al. | |
| 2005/0117593 A1 | 6/2005 | Shand | |
| 2005/0175020 A1 | 8/2005 | Park et al. | |
| 2005/0207410 A1 | 9/2005 | Adhikari | |
| 2006/0013143 A1 | 1/2006 | Yasuie et al. | |
| 2006/0039364 A1 | 2/2006 | Wright | |
| 2006/0072461 A1 | 4/2006 | Luong et al. | |
| 2006/0193332 A1 | 8/2006 | Qian et al. | |
| 2006/0209688 A1 | 9/2006 | Tsuge et al. | |
| 2006/0221950 A1 | 10/2006 | Heer | |
| 2006/0227790 A1 | 10/2006 | Yeung et al. | |
| 2006/0268742 A1 | 11/2006 | Chu et al. | |
| 2006/0274647 A1 | 12/2006 | Wang et al. | |
| 2006/0280179 A1 | 12/2006 | Meier | |
| 2007/0025241 A1 | 2/2007 | Nadeau et al. | |
| 2007/0047463 A1 | 3/2007 | Jarvis et al. | |
| 2007/0165515 A1 | 7/2007 | Vasseur | |
| 2007/0171814 A1 | 7/2007 | Florit et al. | |
| 2007/0177525 A1 | 8/2007 | Wijnands et al. | |
| 2007/0183337 A1 | 8/2007 | Cashman et al. | |
| 2007/0217415 A1 | 9/2007 | Wijnands et al. | |
| 2008/0031130 A1* | 2/2008 | Raj | H04L 45/00 370/225 |
| 2008/0092213 A1 | 4/2008 | Wei et al. | |
| 2008/0212496 A1 | 9/2008 | Zou | |
| 2009/0067322 A1 | 3/2009 | Shand et al. | |
| 2009/0094357 A1 | 4/2009 | Keohane et al. | |
| 2009/0161567 A1 | 6/2009 | Jayawardena et al. | |
| 2009/0193103 A1 | 7/2009 | Small et al. | |
| 2009/0232011 A1 | 9/2009 | Li et al. | |
| 2009/0238196 A1 | 9/2009 | Ukita et al. | |
| 2010/0020719 A1 | 1/2010 | Chu et al. | |
| 2010/0020726 A1 | 1/2010 | Chu et al. | |
| 2010/0191813 A1 | 7/2010 | Gandhewar et al. | |
| 2010/0191839 A1 | 7/2010 | Gandhewar et al. | |
| 2010/0223655 A1 | 9/2010 | Zheng | |
| 2010/0312875 A1 | 12/2010 | Wilerson et al. | |
| 2011/0022725 A1 | 1/2011 | Farkas | |
| 2011/0110241 A1 | 5/2011 | Atkinson et al. | |
| 2011/0138310 A1 | 6/2011 | Gomez et al. | |
| 2011/0170426 A1 | 7/2011 | Kompella et al. | |
| 2011/0199891 A1 | 8/2011 | Chen | |
| 2011/0199941 A1 | 8/2011 | Ouellette et al. | |
| 2011/0243136 A1 | 10/2011 | Raman et al. | |
| 2011/0280572 A1 | 11/2011 | Vobbilisetty et al. | |
| 2011/0286447 A1 | 11/2011 | Liu et al. | |
| 2011/0299406 A1 | 12/2011 | Vobbilisetty et al. | |
| 2011/0321031 A1 | 12/2011 | Dournov et al. | |
| 2012/0030150 A1 | 2/2012 | McAuley et al. | |
| 2012/0057505 A1 | 3/2012 | Xue | |
| 2012/0102114 A1 | 4/2012 | Dunn et al. | |
| 2012/0300669 A1 | 11/2012 | Zahavi | |
| 2013/0055155 A1 | 2/2013 | Wong et al. | |
| 2013/0097335 A1 | 4/2013 | Jiang et al. | |
| 2013/0182712 A1 | 7/2013 | Aguayo et al. | |
| 2013/0208624 A1 | 8/2013 | Ashwood-Smith | |
| 2013/0223276 A1 | 8/2013 | Padgett | |
| 2013/0227689 A1 | 8/2013 | Pietrowicz et al. | |
| 2013/0250779 A1 | 9/2013 | Meloche et al. | |
| 2013/0250951 A1 | 9/2013 | Koganti | |
| 2013/0276129 A1 | 10/2013 | Nelson et al. | |
| 2013/0311663 A1 | 11/2013 | Kamath et al. | |
| 2013/0311991 A1 | 11/2013 | Guang et al. | |
| 2013/0322258 A1 | 12/2013 | Nedeltchev et al. | |
| 2013/0322446 A1 | 12/2013 | Biswas et al. | |
| 2013/0329605 A1 | 12/2013 | Nakil et al. | |
| 2013/0332399 A1 | 12/2013 | Reddy et al. | |
| 2013/0332577 A1 | 12/2013 | Nakil et al. | |
| 2013/0332602 A1 | 12/2013 | Nakil et al. | |
| 2014/0016501 A1 | 1/2014 | Kamath et al. | |
| 2014/0086097 A1 | 3/2014 | Qu et al. | |
| 2014/0146817 A1 | 5/2014 | Zhang | |
| 2014/0149819 A1 | 5/2014 | Lu et al. | |
| 2014/0201375 A1 | 7/2014 | Beereddy et al. | |
| 2014/0219275 A1* | 8/2014 | Allan | H04L 45/16 370/390 |
| 2014/0269712 A1 | 9/2014 | Kidambi | |
| 2015/0016277 A1 | 1/2015 | Smith et al. | |
| 2015/0092593 A1 | 4/2015 | Kompella | |
| 2015/0113143 A1 | 4/2015 | Stuart et al. | |
| 2015/0124586 A1 | 5/2015 | Pani | |
| 2015/0124587 A1 | 5/2015 | Pani | |
| 2015/0124629 A1 | 5/2015 | Pani | |
| 2015/0124642 A1 | 5/2015 | Pani | |
| 2015/0124644 A1 | 5/2015 | Pani | |
| 2015/0124823 A1 | 5/2015 | Pani et al. | |
| 2015/0127701 A1 | 5/2015 | Chu et al. | |
| 2015/0188771 A1 | 7/2015 | Allan et al. | |
| 2015/0378712 A1 | 12/2015 | Cameron et al. | |
| 2015/0378969 A1 | 12/2015 | Powell et al. | |
| 2016/0119204 A1 | 4/2016 | Murasato et al. | |

* cited by examiner

METHOD AND SYSTEM FOR CONSTRUCTING A LOOP FREE MULTICAST TREE IN A DATA-CENTER FABRIC

CROSS-REFERENCES TO RELATED APPLICATIONS

This application claims priority to U.S. Provisional Patent Application No. 61/900,359, entitled "A Scalable Way to do Aging of a Very Large Number of Entities" filed on Nov. 5, 2013, which is hereby incorporated by reference herein in its entirety.

TECHNICAL FIELD

The present technology pertains to data networks and more specifically pertains to a method of constructing a loop free multicast tree in a data-center fabric while minimizing overhead and maximizing faster re-convergence.

BACKGROUND

In a proposed multicast implementation, multiple forwarding tag ("FTAG") multicast trees are constructed from the dense bipartite graph of fabric nodes/edges and each such multicast tree (henceforth called "FTAG" tree) is used to forward a multicast packet for distribution to various fabric edge switches ("ToRs"). Multiple trees are created for load balancing purposes. An external controller decides a suitable root node for each FTAG instance and distributes this information to all the member switches of a fabric. The FTAG trees are created in a distributed manner where each node independently decides which local links should be included in a given instance of an FTAG tree.

During construction of an FTAG tree using the distributed methodology that each node uses, there exists the possibility that a loop will be created if the network view of the various nodes has not converged. i.e. if one node's view of the network topology differs from another's node's view of the same network topology. This occurs because there is a non-significant delay for infra-network routing protocol updates such as intermediate system-to-intermediate system ("IS-IS") or other intra-domain link state routing protocol updates such as Open Shortest Path First ("OSPF") updates to converge when there is simultaneous network link transition. Loops are problematic from multicast tree point-of-view because there can be duplicate packets delivered to end nodes if loops are created in the tree. Thus, care must be taken to ensure that during any instance of FTAG creation there is no intermediate loop in the FTAG tree, and no delay in tree creation, such as when tree construction happens in a serial or lock-step manner.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
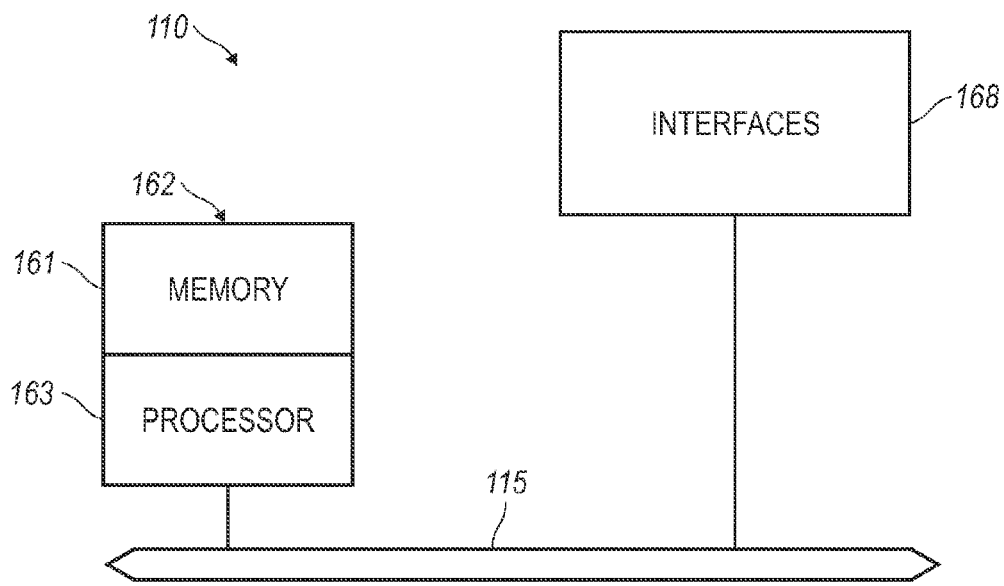
FIG. 1 illustrates an example network device in which embodiments of the present disclosure may be implemented.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The disclosed technology addresses the need in the art for constructing loop-free multicast trees in a data-center fabric. Disclosed are systems, methods, and non-transitory computer-readable storage media for managing downstream switches that request upstream switches to be the designated forwarder in a multicast tree. By sending path information in the request, the method disclosed herein eliminates loops in tree construction without the overhead of sequential convergence.

Overview

In one aspect of the present disclosure, a method for constructing a loop-free tree in a multicast environment is provided. The method includes observing a network topology transition affecting a first path from the particular node to a root node, calculating a second path from the particular node to the root node, sending a message to an upstream node requesting that the upstream node be a root port in the calculated second path, and if the upstream node agrees to be the root port in the calculated second path, creating a new FTAG tree topology view that includes the upstream node as the root port in the second path In another aspect, a system for constructing a loop-free tree in a multicast environment is provided. The system includes a plurality of nodes in a network, the plurality of nodes configured to send and receive packets throughout the network. The plurality of nodes includes a root node and a first node, where the first node includes a memory, and a processor. The processor is configured to observe a network topology transition affecting a first path from the first node to a root node, calculate a second path from the first node to the root node and send a message to an upstream node of the plurality of nodes, the message requesting that the upstream node be a root port in the calculated second path. If the upstream node agrees to be the root port in the calculated second path, the processor is further configured to create a new FTAG tree topology view that includes the upstream node as the root port in the second path Yet another aspect provides a non-transitory computer-readable storage medium having stored therein instructions which, when executed by a processor, cause the processor to perform a series of operations. The operations include observing a network topology transition affecting a first path from a particular node in the network to a root node, calculating a second path from the particular node to the root node, sending a message to an upstream node requesting that the upstream node be a root port in the calculated second path, and if the upstream node agrees to be the root port in the calculated second path, creating a new FTAG tree topology view that includes the upstream node as the root port in the second path.

DETAILED DESCRIPTION

The present disclosure describes systems, methods, and non-transitory computer-readable storage media for creating loop-free multicast trees. In a multicast implementation, multiple forwarding tag (FTAG) multicast trees are constructed from the dense bipartite graph of fabric nodes and edge switches. Each multicast tree (also referred to as "FTAG tree") is used to forward a multicast data packet for distribution to various fabric edge nodes or switches (also referred to as ToRs). Multiple trees are created for load balancing purposes. An external controller decides a suitable root node for each FTAG instance and distributes the information to all member switches of a given fabric. The FTAG trees are created in a distributed manner where each node independently decides, which local links should be included in a given instance of an FTAG tree.

In one example of the present disclosure, each FTAG tree has a designated root node. Each node in the tree is aware of this information for each FTAG instance. Any time that a node observes a network state transition affecting its path to the FTAG root, the node will perform a series of interactive communications with one of its upstream nodes. The node (which can also be referred to as the "downstream node" in this example) contacts a designated upstream node and proposes that the upstream node be the downstream node's designated forwarding node, to the root node. The downstream node sends, with the proposal, a proposed path from the downstream node to the root node including the identity of any intermediate hops. The upstream node agrees to be the downstream node's designated forwarding node if the upstream node agrees with the path sent to it by the downstream node. In this fashion, both nodes have a congruent view of the FTAG tree, and loops within the FTAG can be prevented.

FIG. 1 illustrates an example network device 110 suitable for implementing the present invention. Network device 110 includes a master central processing unit (CPU) 162, interfaces 168, and a bus 115 (e.g., a Peripheral Component Interconnect ("PCI") bus. When acting under the control of appropriate software or firmware, the CPU 162 is responsible for executing packet management, error detection, and/or routing functions, such as miscabling detection functions, for example. CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, Digital Subscriber Line ("DSL") interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM") interfaces, High Speed Serial Interfaces (HSSI), Packet-Over-SONET (POS) interfaces, Fiber Distributed Data Interfaces (FDDI) and the like. Generally, these interfaces may include ports appropriate for communication with the appropriate media. In some cases, they may also include an independent processor and, in some instances, volatile random access memory (RAM). The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2:
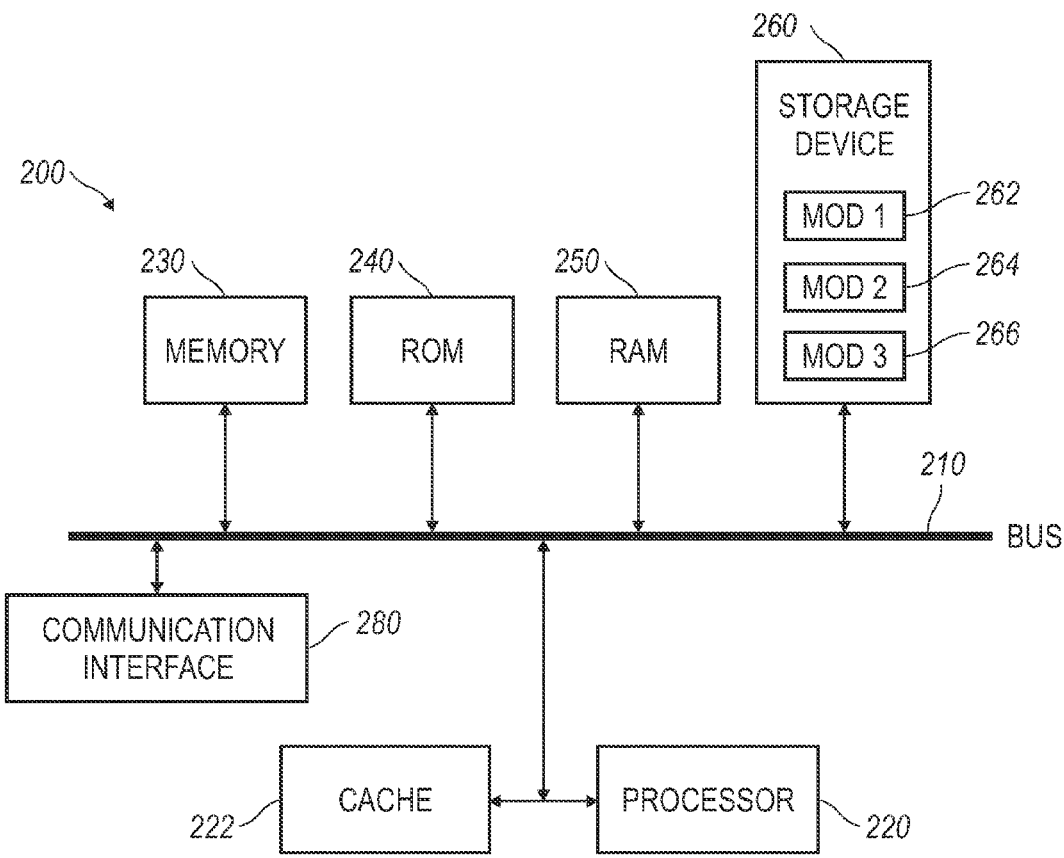
FIG. 2 illustrates an example system embodiment.

FIG. 2 illustrates an example computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

In one example of the methodology described herein, virtual extensible local area network ("VXLAN") is utilized as the infrastructure layer's encapsulation protocol. However, the use of VXLAN is exemplary only, and the methodology can be implemented using any encapsulation technology such as, for example, Transparent Interconnection of Lots of Links (TRILL). In VXLAN, the user's data traffic is injected into the VXLAN network from an ingress switch which encapsulates the user's data traffic within a VXLAN packet with the UDP source port set to a value based on the inner packet's header information. This dynamic setting of the UDP source port in a VXLAN header allows the packet to follow alternate Equal Cost Multi-Paths (ECMPs) within the VXLAN infra-network. At the egress switch (the boundary of the VXLAN network), the packet is de-capsulated and the inner packet (the user data packet) is forwarded out.

Figure 3:
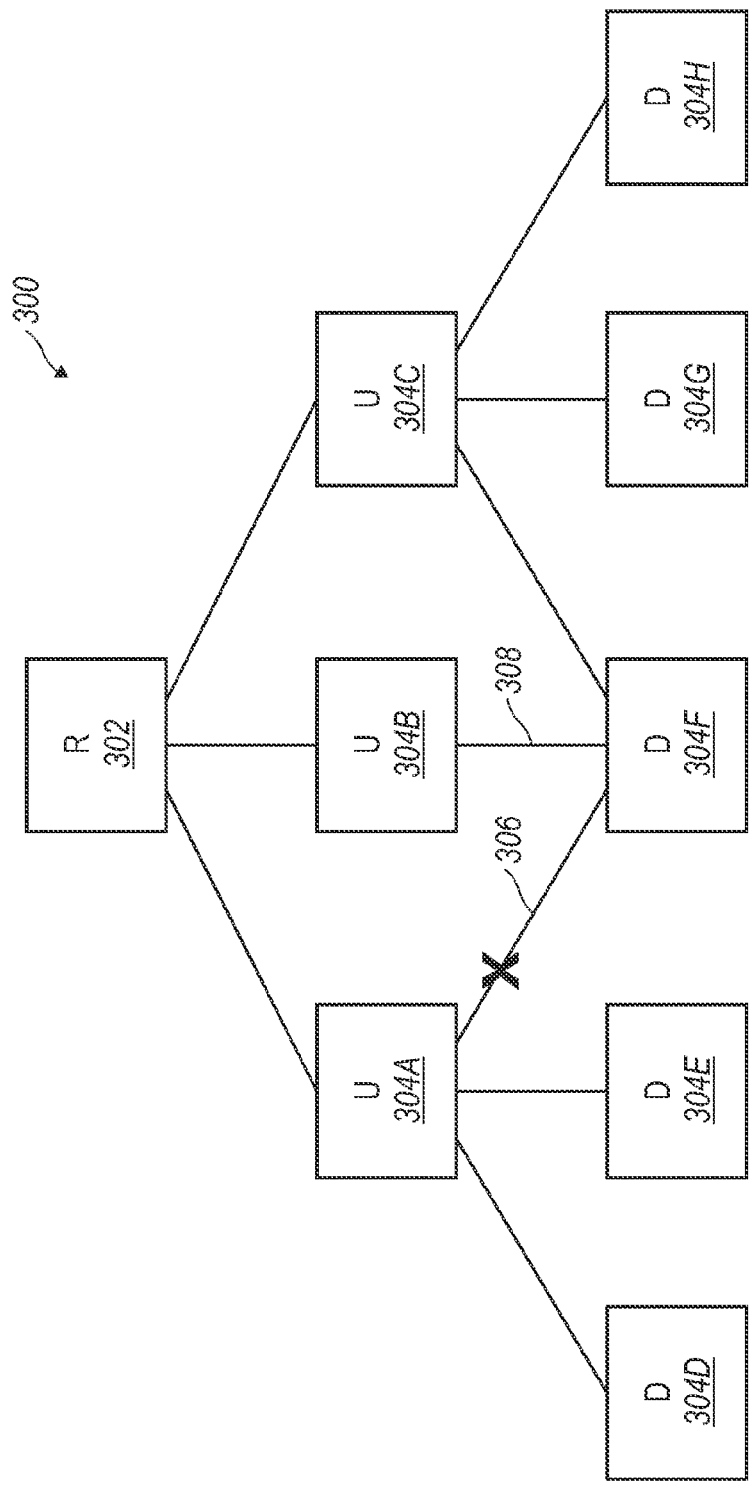
FIG. 3 illustrates an example network topology incorporating the methodology of the present disclosure.

FIG. 3 illustrates an example network topology 300 incorporating the present disclosure. Network topology 300 is, for example, a multicast (or "FTAG") tree that can include a series of nodes or switches interconnected by a series of links or ports, in order to receive and forward data packets to other nodes in network 300. Included in the interconnected series of nodes is a designated root node 302. For load balancing purposes, there may be multiple trees other than the one shown in FIG. 3. Thus, there may be additional root nodes (not shown) included in network 300.

In one example, an external controller determines a designated root node for a given FTAG instance. Thus, root node 302 might be the designated root node for a series of edge nodes 304A-304H (collectively "304") in a particular FTAG tree. The controller distributes this information to all nodes 304 of a given fabric, such that each node 304 is aware of the identity of its corresponding root node 302. In one example, each node decides independently which local links should be included in a given FTAG tree instance.

Let us refer to a particular node in FIG. 3, e.g., node 304F. Node 304F is downstream (indicated as "D") from several upstream nodes in its tree, e.g., node 304A, node 304B, and node 304C Thus, to nodes 304A, 304B, and 304C, node 304F is considered a "downstream node", while nodes 304A, 304B, and 304C are considered "upstream nodes" (indicated as "U") to node 304F. During states of network transition, e.g., when a link in the tree fails, node 304F will perform a series of steps to reevaluate its view of the topology of network 300. For example, let us assume that the link 306 between node 304A and 304F has failed. Node 304F must first determine, by algorithms commonly known in the art, which is the most optimal route to its root node 302. In one example, node 304F determines the shortest path to root node 302 based on its current IS-IS link state database (LSDB) state.

Once it has determined its mots optimal path to node 302, node 304F then sends a message to the upstream node that it believes to be in its calculated shortest path to root node 302, in this example, upstream node 304B. Thus, node 304F is proposing that node 304B be its forwarding node, i.e., the upstream node that will forward data packets from node 304F to its root node 302. Node 304B can choose to either accept or reject this proposal. In its proposal to node 304B, node 304F includes information corresponding to the path that node 304F has determined to be its most optimal path to root node 302. This information could be in the form, for example, of intermediate hop identifiers, such that the receiving upstream node 304B is aware of the path that downstream node 304F believes to be the most optimal path to root node 302. Thus, the proposal from node 304F to node 304B and the corresponding response by node 304B is a way of determining if both nodes have either a convergent or divergent view of the current topology of network 300. If node 304F and node 304B do not view the topology of network 300 is the same manner, then there is the possibility that each node will erroneously allow a link to be part of the FTAG tree, thus resulting in duplicate packets being forwarded to end nodes, i.e., resulting in one or more unwanted intermediate loops.

Once upstream node 304B receives the proposal from node 304F, it can decide whether to accept or reject the proposal. Node 304B will accept the proposal to be the forwarding node for downstream node 304F if it agrees with the optimal path to the root node 302 that node 304F sent along with its proposal. In other words, node 304B determines its own current view of the network 300 after the transition and the most optimal path from node 304B to root node 302. If node 304B believes its own calculated path to root node 302 is a proper subset of the path sent to it from downstream node 304F, with node 304B being the last leg on the path to root node 302, then node 304B will accept the proposal to be the forwarding node for node 304F. If not, node 304B will reject the proposal.

The above accept/reject discussion can be illustrated with reference to FIG. 3. In this example, node 304F is downstream from node 304B. There has been a transition in the network topology, i.e., link 306, connecting node 304F to node 304A has failed. Node 304F calculates an optimal path to root node 302 running through node 304B. Node 304F sends a proposal message to node 304B, requesting that node 304B be its root port, i.e., requests that upstream node 304B is willing to be the node that forwards packets from node 304F to root node 302. The proposal includes an indication of the path that node 304F believes to be the most optimal path to root node 302, i.e., 304F-304B-302. Node 304B has its own view of the network 300. If it determines that its own path to the root node 302 is a subset of the path sent to it by node 304F, it accepts the proposal and agrees to be the forwarding node for node 304F.

However, if the path sent to node 304B by node 304F included a different path to root node 302, for example, 304F-304C-302, then node 304B rejects the proposal because the path it received from node 304F does not include, as a subset, the path node 304B views as its own optimal path to root node 302. If indeed node 304F thinks the path is from 304F-304C-302, then it will send the proposal to node 304C and not node 304B. For example, suppose node 304B thinks that the route to root node 302 is via path 304B-304F-304C-302 (for example in a simultaneous link failure case where the link from node 304B to root node 302 has failed but node 304F is not yet aware of it yet due to convergence delay in the routing protocol). In such a case, node 304B will reject the proposal sent forth by node 304F. Thus, node 304B would not agree to be the forwarding node for node 304F. Eventually, node 304B will have a congruent view of the network and could then, for example, send a message to node 304C requesting that node 304C be its designated forwarder at a later time.

Depending upon the response from upstream node 304B, node 304F can initiate different actions. For example, if node 304B accepts the proposal, based upon the reasons stated above, node 304F proceeds to move its root port to node 304B. It does this by first removing link 306 from its FTAG tree before adding the new root port, link 308, towards upstream node 304B. This assures that no packets can be sent anywhere other than through the path towards upstream node 304B, towards root node 302, thus preventing the occurrence of loops. If node 304B rejects the proposal, node 304F must seek out an alternate upstream node to be its forwarding node. For example, node 304F could send a proposal to node 304C and interact with this node in the same manner as described above. In this fashion, node 304F will seek out other upstream nodes until it finds one that accepts its proposal to act as its forwarding node for node 304F.

Other downstream nodes 304 in network 300 can perform the above interactive process with other upstream nodes at the same time. In other words, while node 304F interacts with upstream node 304B in the propose/accept methodology described above, nodes 304D, 304E, 304G, and 304H can each perform the same methodology with other upstream nodes, i.e., 304A, and 304C at the same time. Because this parallel convergence process occurs regardless of the state of the upstream node, there is no system delay, which would occur if a sequential convergence methodology was utilized.

Figure 4:
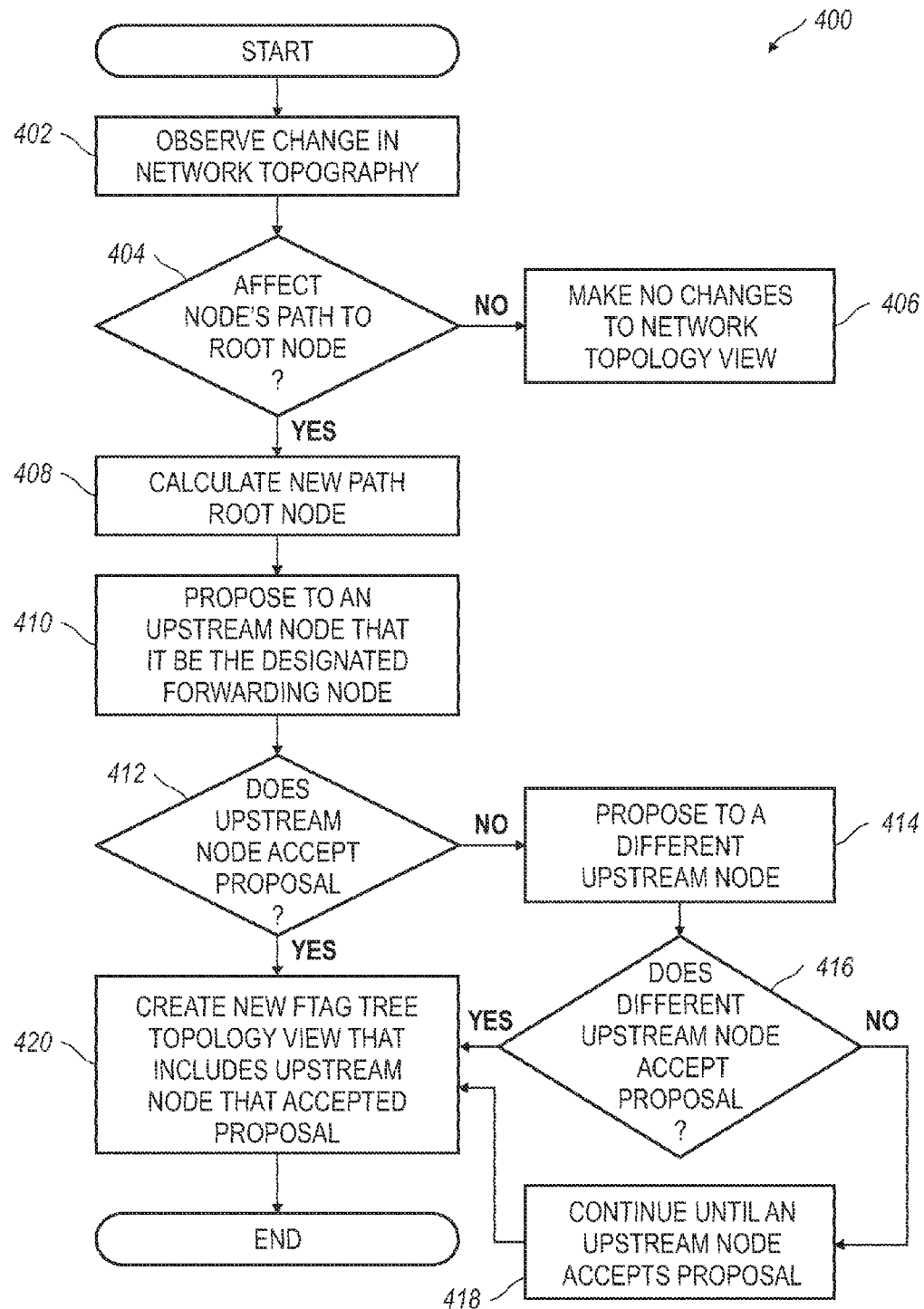
FIG. 4 illustrates an example method utilizing embodiments of the present disclosure.

FIG. 4 illustrates an example method utilizing embodiments of the present disclosure. It should be understood that, for any processes discussed herein, such as those depicted in FIG. 4, there can be additional, fewer, or alternative steps, performed in similar or different orders, or in parallel, within the scope of the various embodiments unless otherwise stated. The method 400 may be performed, for example, by CPU 162, as shown in FIG. 1. CPU could be, for example, part of node 304. In one example, method 400 may be performed simultaneously or substantially simultaneously by some or all of the nodes in network 300. In step 402, a node 304 in network 300 observes a transition in the topology of network 300. This could be, for example, a failed link between the particular node performing method 400 and another upstream node. The discussion below will use node 304F, in FIG. 3, as the node that employs the inventive method of the present disclosure.

Each node 304 in network 300 is aware of its designated root node 302 for each FTAG instance. In one example, an external controller designates a particular root node for each node 304 in network 300. Thus, node 304F is aware that root node 302 is its designated root node. After detecting a change in its network topography view, node 304F, at step 404, determines whether the transition in network 300 has affected the node's path to its designated root node 302. If the network transition has not affected the path of node 304F to its root node 302, then, at step 406, no changes are made to the network topology view of node 304F. If, however, node 304F determines that the network transition has affected its path to root node 302, e.g., link 306 has failed, then, at step 408, node 304F calculates a new route to its root node 302 that does not include link 306. This will involve another root port, or upstream node, that will forward data packets sent by node 304F upstream towards root node 302.

In the manner described above, node 304F, at step 410, sends a message to one of its upstream nodes, e.g., node 304B, proposing that upstream node 304B be a designated forwarding node, i.e., a root port, for future data packets forwarded by node 304F towards root node 302. Upstream node 304B can either accept or reject this proposal. In one example, included in its proposal to its upstream node 304B, node 304F includes information identifying the path node 304F views as its shortest or most optimal path node to its designated root node 304, in light of the failure of link 306. Upstream node 304B will accept the proposal of node 304F if the network topology view that node 304B is congruent with the path it receives, e.g., its own path to root node 302 is part of the path sent to it by downstream node 304F.

If, at step 412, node 304B accepts the proposal from node 304F, then node 304F creates a new network topology view that includes upstream node 304B. If, at step 412, upstream node 304B rejects the proposal, then, at step 414, node 304F seeks out and sends out a proposal to a different upstream node. This scenario may occur, for example, if upstream node 304B views the topology of network 300 in a different way than the network topology viewed by node 304F. One reason that node 304B may not agree with the proposed path from node 304F is that the path that node 304B has derived as its most optimal path to root node 302 is not a subset of the path sent to it in the proposal from node 304B. For example, if the path sent to node 304B by node 304F includes a path from node 304F to node 304C and then to root node 302, then node 304B will reject the proposal. This is because the path that node 304B has determined is its most optimal path to root node 302 is not a part of the path proposed by node 304F, which now includes upstream node 304C. If node 304F believes that the proper path is from node 304F to node 304C to root node 302, then node 304F will forward a proposal to node 304C instead.

In the example above, if node 304B rejects the proposal from node 304F, then node 304F sends another proposal to another upstream node, e.g., node 304C. If it is determined, at step 416, that node 304C accepts the proposal, then, at step 420, node 304F creates a new FTAG tree topology view; adding as its root port, upstream node 304C, and removing its prior root port from its current FTAG tree topology view. If node 304C also rejects the proposal from node 304F, then, at step 418, node 304F continues searching for upstream nodes that will accept its proposal. Method 400 can be performed by some or all of the nodes 304 in network 300 at different times or at the same time, regardless of the state of the upstream node. Thus, the multicast tree for each node 304 of network 300 can be constructed at the same time without the need for delays due to a particular node's inability to forward proposals to other nodes due to the unavailability of nodes while they construct their own individual tree.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A method comprising:
observing a network topology transition affecting a first path from a particular node in a network to a root node;
calculating a second path from the particular node to the root node;
sending a message to an upstream node requesting that the upstream node be a root port in the calculated second path, wherein when the upstream node does not agree to be the root port in the calculated second path, sending a message to an alternate upstream node requesting that the alternate upstream node be the root port in the calculated second path;
sending, by the upstream node, a second message to the alternate upstream node at a later time requesting that the alternate upstream node be the root port in the calculated second path, in response to the upstream node not agreeing to be the root port in the calculated path; and
when the upstream node agrees to be the root port in the calculated second path, the agreeing based on determining that a current path from the upstream node to the root node is a proper subset of the calculated second path, creating a new forwarding tag (FTAG) tree topology view that includes the upstream node as the root port in the second path.

2. The method of claim 1, wherein sending the message to the upstream node requesting that the upstream node be the root port in the calculated second path includes information corresponding to the calculated second path.

3. The method of claim 1, further comprising removing a link corresponding to the affected path from the network topology of the particular node, wherein removing the link corresponding to the affected path occurs before creating the new FTAG tree topology view that includes the upstream node as the root port in the second path.

4. The method of claim 1, wherein creating the new FTAG tree topology view that includes the upstream node as the root port in the second path occurs regardless of a state of the upstream node.

5. The method of claim 1, wherein the particular node and the upstream node reevaluate their respective network topology views upon receipt of a link state routing protocol update.

6. The method of claim 1, wherein the calculated second path from the particular node to the root node is the shortest path from the particular node to the root node.

7. A system comprising:
a plurality of nodes in a network, the plurality of nodes configured to send and receive packets throughout the network, the plurality of nodes including a root node and a first node;
the first node including a memory, and a processor, the processor configured to:
observe a network topology transition affecting a first path from the first node to a root node;
calculate a second path from the first node to the root node;
send a message to an upstream node of the plurality of nodes, the message requesting that the upstream node be a root port in the calculated second path, wherein when the upstream node does not agree to be the root port in the calculated second path, sending a message to an alternate upstream node requesting that the alternate upstream node be the root port in the calculated second path;
sending, by the upstream node, a second message to the alternate upstream node at a later time requesting that the alternate upstream node be the root port in the calculated second path, in response to the upstream node not agreeing to be the root port in the calculated path; and
when the upstream node agrees to be the root port in the calculated second path, the agreeing based on determining that a current path from the upstream node to the root node is a proper subset of the calculated second path, create a new forwarding tag (FTAG) tree topology view that includes the upstream node as the root port in the second path.

8. The system of claim 7, wherein sending the message to the upstream node requesting that the upstream node be the root port in the calculated second path includes information corresponding to the calculated second path.

9. The system of claim 7, the processor further configured to remove a link corresponding to the affected path from the network topology of the first node, wherein removing the link corresponding to the affected path occurs before creating the new FTAG tree topology view that includes the upstream node as the root port in the second path.

10. The system of claim 7, wherein creating the new FTAG tree topology view that includes the upstream node as the root port in the second path occurs regardless of a state of the upstream node.

11. The system of claim 7, wherein the first node and the upstream node reevaluate their respective network topology views upon receipt of a link state routing protocol update.

12. The system of claim 7, wherein at least one other node in the plurality of nodes creates a new FTAG tree topology view that includes a corresponding upstream node as a root port in parallel with the first node creating its new FTAG tree topology.

13. A non-transitory computer-readable storage medium having stored therein instructions which, when executed by a processor, cause the processor to perform operations comprising:
    observing a network topology transition affecting a first path from a particular node in the network to a root node;
    calculating a second path from the particular node to the root node;
    sending a message to an upstream node requesting that the upstream node be a root port in the calculated second path, wherein when the upstream node does not agree to be the root port in the calculated second path, sending a message to an alternate upstream node requesting that the alternate upstream node be the root port in the calculated second path;
    sending, by the upstream node, a second message to the alternate upstream node at a later time requesting that the alternate upstream node be the root port in the calculated second path, in response to the upstream node not agreeing to be the root port in the calculated path; and
    when the upstream node agrees to be the root port in the calculated second path, the agreeing based on determining that a current path from the upstream node to the root node is a proper subset of the calculated second path,
    creating a new forwarding tag (FTAG) tree topology view that includes the upstream node as the root port in the second path.

14. The non-transitory computer-readable storage medium of claim 13, wherein sending the message to the upstream node requesting that the upstream node be the root port in the calculated second path includes information corresponding to the calculated second path.

15. The non-transitory computer-readable storage medium of claim 13, storing additional instructions which, when executed by the processor, result in operations further comprising removing a link corresponding to the affected path from the FTAG tree topology of the particular node, wherein removing the link corresponding to the affected path occurs before creating the new FTAG tree topology view that includes the upstream node as the root port in the second path.

16. The non-transitory computer-readable storage medium of claim 13, wherein creating the new FTAG tree topology view that includes the upstream node as the root port in the second path occurs regardless of a state of the upstream node.

17. The non-transitory computer-readable storage medium of claim 13, wherein the particular node and the upstream node reevaluate respective network topology views upon receipt of a link state routing protocol update.

* * * * *